(12) United States Patent
Maneri et al.

(10) Patent No.: US 12,177,295 B1
(45) Date of Patent: Dec. 24, 2024

(54) TECHNIQUES FOR PROVIDING NETWORK APPLICATIONS

(71) Applicant: Amazon Technologies, Inc., Seattle, WA (US)

(72) Inventors: Justin Maneri, Anaheim, CA (US);
Brian Fisher, Lake Forest, CA (US);
Jake Matthew Kulanko, Bellevue, WA (US); Arjuna Baratham, Irvine, CA (US); Ryan Meyer, Irvine, CA (US);
Mickey Ottis Williams, Fallbrook, CA (US)

(73) Assignee: Amazon Technologies, Inc., Seattle, WA (US)

( * ) Notice: Subject to any disclaimer, the term of this patent is extended or adjusted under 35 U.S.C. 154(b) by 829 days.

(21) Appl. No.: 17/217,668

(22) Filed: Mar. 30, 2021

(51) Int. Cl.
| | |
|---|---|
| *H04L 67/1095* | (2022.01) |
| *G06F 8/41* | (2018.01) |
| *G06F 8/61* | (2018.01) |
| *G06F 8/70* | (2018.01) |
| *H04L 67/1097* | (2022.01) |

(52) U.S. Cl.
CPC .......... *H04L 67/1095* (2013.01); *G06F 8/427* (2013.01); *G06F 8/61* (2013.01); *G06F 8/63* (2013.01); *G06F 8/70* (2013.01); *H04L 67/1097* (2013.01)

(58) Field of Classification Search
CPC ..... G06F 8/61; G06F 8/63; G06F 8/70; H04L 67/1097
See application file for complete search history.

(56) References Cited

U.S. PATENT DOCUMENTS 10,831,896 B2 * 11/2020 Brant ...................... H04L 63/06
2003/0159138 A1 * 8/2003 Curtis ....................... G06F 8/62
719/321

(Continued)

OTHER PUBLICATIONS

Yuhua Lin et al., "CloudFog: Leveraging Fog to Extend Cloud Gaming for Thin-Client MMOG with High Quality of Service," 2017 [retrieved on Dec. 2, 2023], IEEE Transactions on Parallel and Distributed Systems, vol. 28, Issue 2, pp. 431-445, downloaded from <url>:https://ieeexplore.ieee.org. (Year: 2017).*

(Continued)

*Primary Examiner* — S. Sough
*Assistant Examiner* — Stephen D Berman
(74) *Attorney, Agent, or Firm* — Lee & Hayes, P.C.

(57) ABSTRACT

Techniques for providing network applications are described. For instance, system(s) may install a network application onto a virtual server. While installing the network application, the system(s) may monitor the installation in order to identify events. The system(s) may then generate a first file that includes file events, a second file that includes registry events, and a third file that includes service events. Additionally, the system may copy the software files installed on the virtual server. The system(s) may then generate a software package that includes the files and store the software package on a virtual storage device. After storing the software package, the system(s) may make copies of the software package and store the copies on multiple virtual storage devices. The system(s) may then use the virtual storage devices to install and launch the network application on virtual servers.

20 Claims, 13 Drawing Sheets

(56) References Cited

U.S. PATENT DOCUMENTS

| | | | | |
|---|---|---|---|---|
| 2009/0113418 | A1* | 4/2009 | Haase | G06F 8/61 |
| | | | | 717/178 |
| 2013/0132942 | A1* | 5/2013 | Wang | G06F 9/45504 |
| | | | | 717/176 |
| 2015/0301815 | A1* | 10/2015 | Tervo | G06F 8/61 |
| | | | | 717/178 |
| 2016/0034294 | A1* | 2/2016 | Christenson | G06F 8/60 |
| | | | | 718/1 |
| 2020/0125351 | A1* | 4/2020 | Zlatnik | H04L 67/51 |

OTHER PUBLICATIONS

E. Fadda et al., "Monitoring-Aware Optimal Deployment for Applications Based on Microservices," 2019 [retrieved on Jul. 27, 2024], IEEE Transactions on Services Computing, vol. 14, Issue 6, pp. 1849-1863, downloaded from <url>:https://ieeexplore.ieee.org. (Year: 2019).*

* cited by examiner

FILE STRUCTURE
402

| NAME | TYPE | LAST MODIFIED | SIZE | STORAGE CLASS |
|---|---|---|---|---|
| BUNDLE | FILE | DATE 1 | SIZE 1 | CLASS 1 |
| BUNDLE CONTEXT | FILE | DATE 2 | SIZE 2 | CLASS 2 |
| DEVICE | FOLDER | DATE 3 | SIZE 3 | CLASS 3 |
| DEFAULT SETTINGS | FOLDER | DATE 4 | SIZE 4 | CLASS 4 |
| INSTALL | FILE | DATE 5 | SIZE 5 | CLASS 5 |
| LAUNCH | FILE | DATE 6 | SIZE 6 | CLASS 6 |
| LAUNCH LOG | FILE | DATE 7 | SIZE 7 | CLASS 7 |
| EVENT LOGS | FILE | DATE 8 | SIZE 8 | CLASS 8 |
| REGISTRY | FILE | DATE 9 | SIZE 9 | CLASS 9 |
| SERVICE | FILE | DATE 10 | SIZE 10 | CLASS 10 |
| PROGRAM | FILE | DATE 11 | SIZE 11 | CLASS 11 |
| EVENTS | FILE | DATE 12 | SIZE 12 | CLASS 12 |
| PROMPT SPINNER | STRING | DATE 13 | SIZE 13 | CLASS 13 |

FIG. 4

LOG FILE 416

EVENT 502(1)
TYPE: "PROCESS EVENT 1"
PROCESS NAME: "NAME 1"
PROCESS ID: "IDENTIFIER 1"
PATH: "PATH 1"
CHILD ID: "IDENTIFIER 2"
EVENT NUMBER: 1

EVENT 502(2)
TYPE: "PROCESS EVENT 2"
PROCESS NAME: "NAME 2"
PROCESS ID: "IDENTIFIER 2"
PATH: "PATH 2"
CHILD ID: "IDENTIFIER 2"
EVENT NUMBER: 2

EVENT 502(3)
TYPE: "PROCESS EVENT 3"
PROCESS NAME: "NAME 3"
PROCESS ID: "IDENTIFIER 3"
PATH: "PATH 3"
CHILD ID: "IDENTIFIER 3"
EVENT NUMBER: 3

EVENT 502(4)
TYPE: "PROCESS EVENT 4"
PROCESS NAME: "NAME 4"
PROCESS ID: "IDENTIFIER 4"
PATH: "PATH 4"
CHILD ID: "IDENTIFIER 4"
EVENT NUMBER: 4

FIG. 5

EVENTS FILE 418

---
EVENT 602(1)
TYPE: "PROCESS EVENT 1"
PROCESS NAME: "NAME 1"
PROCESS ID: "IDENTIFIER 1"
PATH: "PATH 1"
EVENT NUMBER: 1

---
EVENT 602(2)
TYPE: "PROCESS EVENT 1"
PROCESS NAME: "NAME 11"
PROCESS ID: "IDENTIFIER 11"
PATH: "PATH 11"
EVENT NUMBER: 11

---
EVENT 602(3)
TYPE: "PROCESS EVENT 1"
PROCESS NAME: "NAME 21"
PROCESS ID: "IDENTIFIER 21"
PATH: "PATH 21"
EVENT NUMBER: 21

---
EVENT 602(4)
TYPE: "PROCESS EVENT 1"
PROCESS NAME: "NAME 31"
PROCESS ID: "IDENTIFIER 31"
PATH: "PATH 31"
EVENT NUMBER: 31

FIG. 6

REGISTRY FILE 420

EVENT
702(1)
TYPE: "PROCESS EVENT 2"
PROCESS NAME: "NAME 2"
PROCESS ID: "IDENTIFIER 2"
PATH: "PATH 2"
EVENT NUMBER: 2

EVENT
702(2)
TYPE: "PROCESS EVENT 2"
PROCESS NAME: "NAME 12"
PROCESS ID: "IDENTIFIER 12"
PATH: "PATH 12"
EVENT NUMBER: 12

EVENT
702(3)
TYPE: "PROCESS EVENT 2"
PROCESS NAME: "NAME 22"
PROCESS ID: "IDENTIFIER 22"
PATH: "PATH 22"
EVENT NUMBER: 22

EVENT
702(4)
TYPE: "PROCESS EVENT 2"
PROCESS NAME: "NAME 32"
PROCESS ID: "IDENTIFIER 32"
PATH: "PATH 32"
EVENT NUMBER: 32

FIG. 7

SERVICE FILE 422

EVENT 802(1)

TYPE: "PROCESS EVENT 3"
PROCESS NAME: "NAME 3"
PROCESS ID: "IDENTIFIER 3"
PATH: "PATH 3"
SERVICE NAME: "SERVICE 1"
EVENT NUMBER: 3

EVENT 802(2)

TYPE: "PROCESS EVENT 3"
PROCESS NAME: "NAME 13"
PROCESS ID: "IDENTIFIER 13"
PATH: "PATH 13"
SERVICE NAME: "SERVICE 2"
EVENT NUMBER: 13

EVENT 802(3)

TYPE: "PROCESS EVENT 3"
PROCESS NAME: "NAME 23"
PROCESS ID: "IDENTIFIER 23"
PATH: "PATH 23"
SERVICE NAME: "SERVICE 3"
EVENT NUMBER: 23

FIG. 8

KEY FILE 902

KEY 904(1)
KEY: "PATH 1"
VALUE: "VALUE 1"
TYPE: "TYPE 1"
DATA: "DATA 1"

KEY 904(2)
KEY: "PATH 2"
VALUE: "VALUE 2"
TYPE: "TYPE 2"
DATA: "DATA 2"

KEY 904(3)
KEY: "PATH 3"
VALUE: "VALUE 3"
TYPE: "TYPE 3"
DATA: "DATA 3"

KEY 904(4)
KEY: "PATH 4"
VALUE: "VALUE 4"
TYPE: "TYPE 4"
DATA: "DATA 4"

FIG. 9

TECHNIQUES FOR PROVIDING NETWORK APPLICATIONS

BACKGROUND

As gaming has become popular, companies have created new techniques, such as network accessible systems, that allow users to play various types of games. For example, a system, which may be wirelessly connected to a television via network(s), may cause the television to display content related to a state of a game. While the television is displaying the content, the system may receive, via the network(s), inputs from a video game controller and update, using the inputs, the state of the game being displayed by the television. Based on the number of users that attempt to play the same game, the system may need to create multiple instances for accessing the game. This way, each of the users is able to connect to a respective instance in order to play the game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example file structure for a software package, in accordance with examples of the present disclosure.

FIG. 5 illustrates an example of a log file, in accordance with examples of the present disclosure.

FIG. 6 illustrates an example of an events file, in accordance with examples of the present disclosure.

FIG. 7 illustrates an example of a registry file, in accordance with examples of the present disclosure.

FIG. 8 illustrates an example of a service file, in accordance with examples of the present disclosure.

FIG. 9 illustrates an example of a key file, in accordance with examples of the present disclosure.

DETAILED DESCRIPTION

Figure 1:
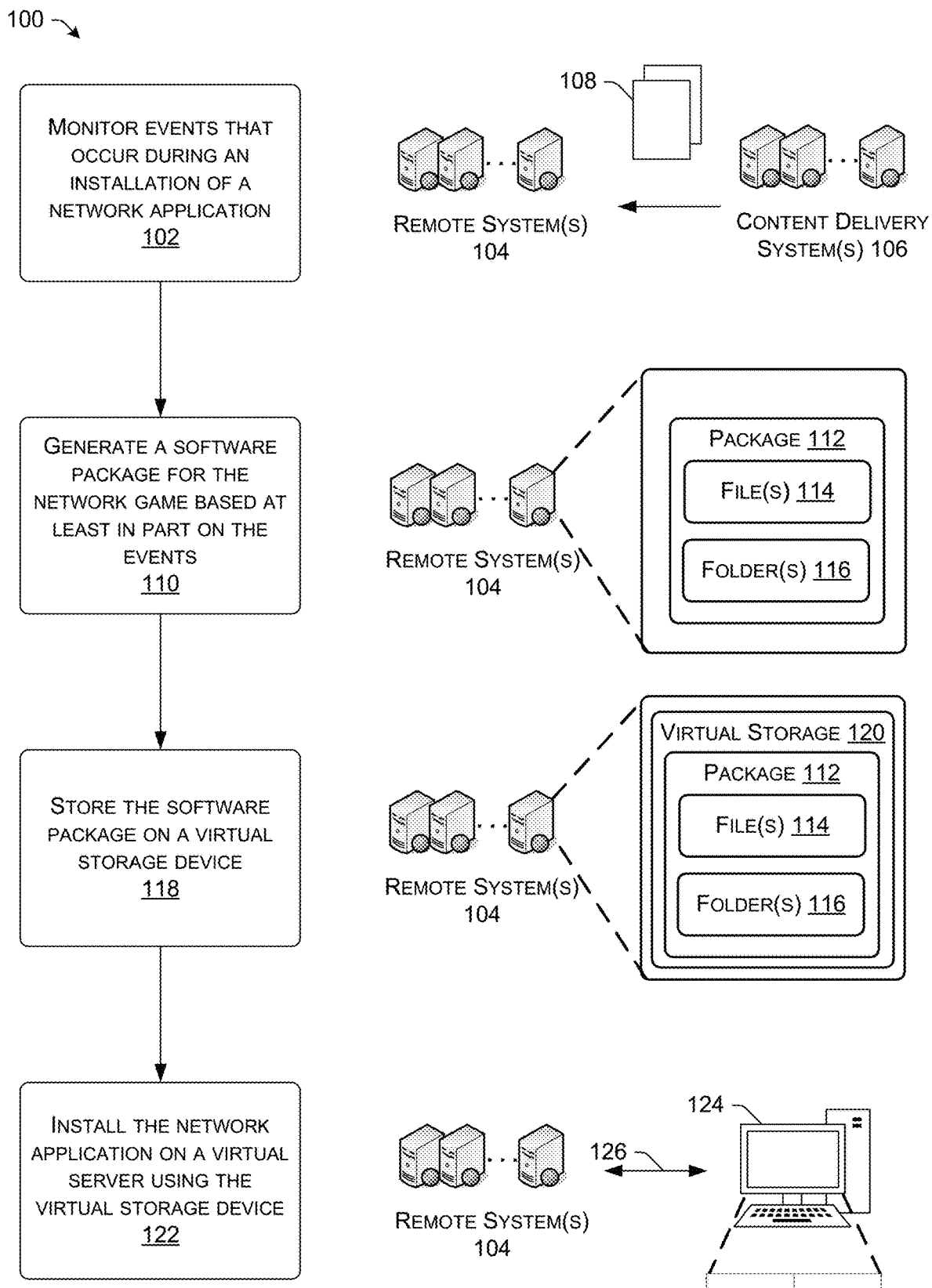
FIG. 1 illustrates an example process for providing access to a network application, in accordance with examples of the present disclosure.

This disclosure describes, in part, techniques for providing network applications. For instance, remote system(s) may install, from a content delivery system, a network application onto a virtual server. While installing the network application, the remote system(s) may monitor the installation and generate one or more files representing events that occurred during the installation. Additionally, at the end of the installation, the remote system(s) may copy each of the software files that were installed on the virtual server. The remote system(s) may then generate a software package that includes the files and store the software package on a virtual storage device. Next, the remote system(s) are able to generate copies of the software package stored on the virtual storage device, store the copies of the software package on additional virtual storage devices, and associate the additional virtual storage devices with virtual servers associated with the network application. This may cause the network application to be installed and launched on each virtual server such that users are able to connect to and use the network application.

For more detail, the remote system(s) may create a virtual server (referred to, in some examples, as a "first virtual server") that the remote system(s) use to install the network application. As described herein, a virtual server may include a server (e.g., a computer and server programs) that executes at a remote location and is used to run applications. For example, the virtual server may include one or more dedicated computing resources, such as central processing units (CPUs), memory, storage devices, network capacity, and/or the like for running and providing the application. The remote system(s) may then begin to install the network application onto the first virtual server. Installing the network application may include at least installing the software files, the registry keys, the services, and/or resources associated with the network application. Additionally, after the network application is installed, the remote system(s) may cause the network application to launch the using the first virtual server followed by causing the network application to terminate.

To install the network application, the remote system(s) a program onto the first virtual server that uses a file (referred to, in some examples, as a "configuration file") that includes processes for execution, where the processes are associated with installing, launching, and/or terminating the network application. For instance, and using the configuration file, the remote system(s) may initially run a first process that includes first parameters, followed by running a second process that includes second parameters, followed by running a third process that includes third parameters, and/or so forth. For example, the configuration file may include at least first process(es) associated with downloading the network application, followed by second process(es) associated with starting the monitoring and recording of events, followed by third process(es) associated with installing the network application, followed by fourth process(es) associated with launching the network application, followed by fifth process(es) associated with terminating the network application, followed by sixth process(es) associated with stopping the monitoring. In some examples, the configuration file may further include an identifier associated with the network application, a username, credentials, and/or any other information that the remote system(s) use to identify, download, and/or install the network application.

The remote system(s) may also monitor the installing, the launching, and/or the terminating of the network application in order to identify events associated with the network application. In some examples, the events may include each of the processes that were created and/or executed using the processes from the configuration file. For example, the events may include, but are not limited to, start process events, file creating events, file writing events, file reading events, registry key writing events, registry key reading events, registry entry writing events, registry entry reading events, service writing events, renaming a file, and/or any other type processing event. In some example, the remote system(s) may then generate a file (referred to, in some examples, as a "log file") that includes each of the events. For instance, and for each event, the log file may include at least a process type, a process name, a process identifier, a path for the process (e.g., the file location for the process), a child process identifier, and/or an event number.

The remote system(s) may then parse through the log file and generate one or more additional files associated with the events. For a first example, the remote system(s) may generate a file (referred to, in some examples, as an "events file") that includes one or more of the events that are associated with software files of the network application (e.g., reading, creating, writing, and/or the like software files). For a second example, the remote system(s) may generate a file (referred to, in some examples, as a "registry file") that includes one or more of the events that are associated with registering the network application. For a third example, the remote system(s) may generate a file (referred to, in some examples, as a "service file") that includes one or more events that are associated with service(s) for the network application.

Using one or more of the files, the remote system(s) are then able to retrieve and copy the software files, associated with the network application, that were installed onto the first virtual server. In some examples, the remote system(s) copy the software files using a same structure (e.g., tree structure) as the software files are stored on the first virtual server. For example, the remote system(s) may store the software files in a drive, such as a "C" drive, using a similar structure as the software files were stored in a similar drive on the first virtual server. The remote system(s) may then generate the software package that includes at least the file(s) (e.g., the log file, the events file, the registry file, the service file, etc.) and the copy of the software files. In some examples, the software package may correspond to a bundle that includes the files.

In some examples, the remote system(s) may also generate a file (referred to, in some examples, as a "key file") that includes keys associated with the registry. For example, and for each key, the key file may include a path to the key, a key value, a key type, key data, and/or the like. In some examples, the remote system(s) generate the key file by analyzing the registry file in order to identify each of the key(s) and/or each of the key(s) that were modified. The remote system(s) may then store the key file in the software package.

In some examples, the remote system(s) may also generate a file (referred to, in some examples, as an "install file") that includes one or more commands to install the network application and/or a file (referred to, in some examples, as a "launch file") that includes one or more commands for launching the network application. In some examples, the remote system(s) generate the install file and/or the launch file using the configuration file. The remote system(s) may then store the install file and/or the launch file in the software package. Once the software package is complete, the remote system(s) may then store the software package on a virtual storage device (referred to, in some examples, as a "first virtual storage device").

For example, the remote system(s) may receive, from a user device, a request to generate the first virtual storage device. The request may include, but is not limited to, a type of storage, a size of the storage, and/or any other information. The remote system(s) may then generate the first virtual storage device to include the type and the size. After generating the first virtual storage device, the remote system(s) may store the software package on the first virtual storage device. The remote system(s) are then able generate a copy of the software package stored on the first virtual storage and store the copies of the software package on additional virtual storage devices (referred to, in some examples, as "second virtual storage devices").

In some examples, to copy the software package, the remote system(s) take a point-in-time copy, such as a snapshot, of the state of the virtual storage device. For example, the point-in-time copy may include the information (e.g., the data) that is required to again generate the software package onto another virtual storage device. In some instances, such as when the remote system(s) install an update to the network application, the remote system(s) may generate a copy of the updated software package. In some examples, the remote system(s) generate a copy of the entire software package. For example, the remote system(s) may generate a point-in-time copy of the virtual storage device that includes the updated software application. However, in other examples, the remote system(s) may only generate a copy of the updates to the software package on the virtual storage device. For example, the remote system(s) may generate a new point-in-time copy of the updated data on the virtual storage device and then store that new point-in-time copy with the original point-of-time copy of the software package before the update.

As described herein, a virtual storage device may include a storage volume, such as an Elastic Block Store (EBS), that is stored remotely (e.g., a cloud-based storage) from user devices. In some examples, the remote system(s) may generate different types of virtual storage devices. For example, the remote system(s) may generate solid-state drives, hard disk drive, and/or any other type of remote storage drives. After the remote system(s) generate the virtual storage device, users can cause the remote system(s) to create a file system on the virtual storage device, run a database on the virtual storage device, store an application on the virtual storage device, and/or perform one or more additional and/or alternative processes with the virtual storage device.

The remote system(s) may then generate additional virtual servers (referred to, in some examples, as "second virtual servers") for the network application. Additionally, the remote system(s) may associate a respective second virtual storage device with each of the second virtual servers. In some examples, the remote system(s) associate the respective second virtual storage device with each of the second virtual servers by attaching, over network(s), the respective second virtual storage devices to each of the second virtual servers. By associating the second virtual storage devices with the second virtual server(s), the network application may be installed on the second virtual servers.

For example, and for a second virtual server, the install file stored on the second virtual storage device may execute and cause the installing of the network application onto the second virtual server. In some examples, to install the network application, a program may create links that point to the software files stored on the second virtual storage device. In some examples, the links may include, but are not limited to, junctions, symlinks, and/or any other type of file that points to the locations of the software files on the second virtual storage device. The program may then store the links on a drive of the second virtual server. In some examples, the links are stored on a "C" drive of the second virtual server. By storing the links, all of the software files associated with the network application are not required to be copied and installed onto the drive(s) of the second virtual server when installing the network application onto the second virtual server.

Additionally, the program may iterate through all of the register keys from the key file and make command(s) to the operating system of the second virtual server. In some examples, each command is to create a key and store the value associated with the key, at the key type, with the data associated with the key in the registry associated with the second virtual server. The program may perform similar processes for each of the services. For example, the program may iterate through all of the services from the service file and make command(s) to the operating system of the second virtual server. In some examples, each command is to create a service and then store the data associated with a service on the second virtual server. In some examples, the service may include a service descriptor that indicates who has permission to use the service. This may also be installed during the installation process.

In some examples, and for a given network application, the remote system(s) may generate more than one virtual storage device, where each virtual storage device includes a respective software package for launching the network application. For example, if the network application includes a network game, the network game may require a specific application (e.g., a client application) that runs in the background in order to launch the network game. As such, the remote system(s) may perform similar processes as those described above to generate a software package (referred to, in some examples, as a "second software package") for the specific application based on installing, launching, and/or terminating the application. The remote system(s) may then store the second software package onto a virtual storage device (referred to, in some examples, as a "third virtual storage device").

Additionally, after storing the second software package, the remote system(s) are then able generate copies of the second software package stored on the third virtual storage device and store the copies of the second software package on additional virtual storages devices (referred to, in some examples, as "fourth virtual storages devices"). The remote system(s) may then associate a respective fourth virtual storage device with each of the second virtual servers along with the second virtual storage device. This way, each of the second virtual servers is associated with the second virtual storage device that includes the software package for the network game and the fourth virtual storage device that includes the background application for running the network game. Once associated, similar processes may be performed, as described above, to install the background application from the fourth virtual storage device onto the second virtual server.

Once the installation of the network application onto the second virtual servers are complete, users are then able to access the network application using the second virtual servers. For example, the remote system(s) may receive, from a user device, a request to access the network application. Based on the request, the remote system(s) may assign the user device to a second virtual server that is associated with the network application. When the second virtual server then begins to run, the second virtual server may execute the launch file stored on the second virtual storage device, wherein the launch file causes the launching of the network application. For example, if the network application includes a network game, the launch file may start the network game for the user. The remote system(s) may then begin to send data (e.g., video data, audio data, etc.) to and/or receive data (e.g., input data) from the user device while the user is assigned to the second virtual server.

For instance, the remote system(s) may send, to the user device, data (e.g., video data, audio data, etc.) representing a first state of the network application. For example, if the network application includes a network game, the first state of the network application may include an object (e.g., a character) located at a first position within a gaming environment (e.g., a forest). The user device may receive the data from the remote system(s) and, using the data, the user device may display image(s) representing the first state of the network application. For example, and again if the network application includes the network game, the user device may display content representing the object located at the first position within the gaming environment. In some instances, the user device may further output sound represented by the audio data. The user may then use the user device and/or a separate control device to provide inputs to the network application via the remote system(s).

For instance, the control device may receive an input, such as a selection of a button, joystick, key, touch-sensitive pad, sensor, and/or the like associated with the control device. The control device may then send, to the remote system(s), data representing the input. Using the data, the remote system(s) may update the first state of the network application to a second state of the network application. For example, and again if the network application includes the network game, the input may be associated with moving the object forward by a given amount within the gaming environment. As such, the remote system(s) may update the first state of the of the network application to the second state of the network application by moving the object forward in the environment by the given amount.

The remote system(s) may then send, to the user device, data (e.g., video data, audio data, etc.) representing the second state of the network application. Using the data, the user device may display image(s) representing the second state of the game. For example, the user device may display content representing the object located at the second position within the gaming environment. Additionally, in some instances, the user device may output sound represented by the audio data. The remote system(s) may then continue to perform similar processes to update the state of the network application on the user device as the remote system(s) continues to receive data from the control device.

By performing the processes described herein, the remote system(s) are able to generate multiple virtual servers (e.g., instances) associated with a network application using a single software package. For example, the remote system(s) may only need to generate the one software package for the network application and then copy that software application onto a respective virtual storage device for each of the virtual servers. The network application may then be automatically installed on the virtual servers using the virtual storage devices. Additionally, by performing the processes described herein, the remote system(s) are able to more quickly generate the virtual servers for the network application. For example, by generating the links to the software files stored on the virtual storage devices, and then storing the links on the virtual servers, the remote system(s) do not have to copy and then install all of the software files onto each of the virtual servers.

As described herein, a file may include, but is not limited to, a JavaScript Object Notation (JSON) file, a Batch file, a Hypertext Markup Language (HTML) file, an Extensible Markup Language (XML) file, an executable (EXE) file, a log file, a zip file, and/or any other file format type. For example, the events file, the registry file, and the service file may each include a first file format type, such as JSON, while the install file and the launch file each include a second file format type, such as BAT. Additionally, as described herein, an identifier may include, but is not limited to, a numerical identifier, an alphabetic identifier, a mixed numerical and alphabetic identifier, and/or any other type of identifier.

FIG. 1 illustrates an example process 100 for providing access to a network application, in accordance with examples of the present disclosure. At 102, the process 100 may include monitoring events that occur during an installation of a network application. For instance, remote system(s) 104 may receive, from content delivery system(s) 106, data 108 associated a network application. The remote system(s) 104 may then use the data 108 to install the network application. In some examples, the remote system(s) 104 install the network application onto a virtual server. After installing the network application, the remote system(s) 104 may then launch the network application followed by terminating the network application. During these processes, the remote system(s) 104 may be monitoring for events that occur with regard to the installation, the launching, and/or the termination.

At 110, the process may include generating a software package 112 for the network game based at least in part on the events. For instance, the remote system(s) 104 may generate a log file 114 that includes the events. After generating the log file 114, the remote system(s) 104 may parse through the log file 114 in order to specific types of events. The remote system(s) 104 may then generate an events file 114 that includes one or more of the events that are associated with software files of the network application, a registry file 114 that includes one or more of the events that are associated with registering the network application, and/or a service file 114 that includes one or more of the events that are associated with service(s) for network application.

Using file(s) 114, the remote system(s) 104 are then able to retrieve and copy the software files associated with the network application. In some examples, the remote system(s) 104 copy the software files into a folder 116 using a same structure (e.g., tree structure) as the software files are stored on the virtual server. For example, the remote system(s) 104 may store the software files in a drive, such as a "C" drive, using a similar structure as the software files were stored in a similar drive on the virtual server. The remote system(s) 104 may then generate the software package 112 that includes at least the file(s) 114 and the folder 116 that includes the copy of the software files. In some examples, the software package 112 may correspond to a bundle that includes the files.

In some examples, the remote system(s) 104 may generate one or more additional files associated with the network application. For example, the remote system(s) 104 may generate an install file 114 that includes one or more commands to install the network application and/or a launch file 114 that includes one or more commands for launching the network application. In such an example, the remote system(s) 104 may then store the install file 114 and/or the launch file 114 in the software package 112.

At 118, the process 100 may include storing the software package 112 on a virtual storage device 120. For example, the remote system(s) 104 may generate the virtual storage device 120 for the software package 112. In some examples, the remote system(s) 104 generate the virtual storage device 120 based on receiving a request from a user device. For example, the request may include information for creating the virtual storage device 120, such as the type and/or size of the virtual storage device 120. After generating the virtual storage device 120, the remote system(s) 104 may store the software package 112 on the virtual storage device 120. In some examples, the remote system(s) 104 may then make copies of the software package 112 stored on the virtual storage device 120 and store the copies on additional virtual storage devices 120 associated with the network application.

At 122, the process 100 may include installing the network application onto a virtual server using the virtual storage device 120. For instance, the remote system(s) 104 may generate the virtual server for the network application. The remote system(s) 104 may then associate the virtual storage device 120 with the virtual server. In some examples, based on performing the association, the install file 114 may cause the network application to be installed onto the virtual server. For example, the install file 114 may include command(s) that cause a program to analyze the files 114 remap the network application (e.g., the software files) onto the virtual server. In some examples, to remap the network application onto the virtual server, the program may generate links that point to the software files stored in the folder(s) 116. The program may then store the links on a drive of the virtual server, where the drive of the virtual server corresponds to a drive associated with the folder(s) 116. In some examples, the program stores the links based on the structure of the software files on the virtual storage device 120.

Additionally, the program may iterate through all of the register keys included in the registry file 114 and make command(s) to the operating system of the virtual server, where each command is to create a key and store the key in the register of the virtual server. Furthermore, the program may iterate through all of the services from the service file 114 and make command(s) to the operating system of the virtual server, where each command is to create a service and then store the data associated with a service. In some examples, the remote system(s) 104 may perform similar processes in order to install the network application onto more than one virtual server using the additional virtual storage devices 120 that includes the copies of the software package 112.

As further illustrated in the example of FIG. 1, a user device 124 may connect to the virtual server in order to access the network application, which is illustrated by 126. For example, the remote system(s) 104 may receive, from the user device 124, a request to access the network application. Based on the request, the remote system(s) 104 may assign the user device 124 to the virtual server that is associated with the network application. The virtual server may execute the launch file 114 stored on the virtual storage device 120 which causes the launching of the network application. The remote system(s) may then begin to send data (e.g., video data, audio data, etc.) to and/or receive data (e.g., input data) from the user device 124 while the user is accessing the network application. As shown by the example of FIG. 1, the network application may include a sports game.

Figure 2:
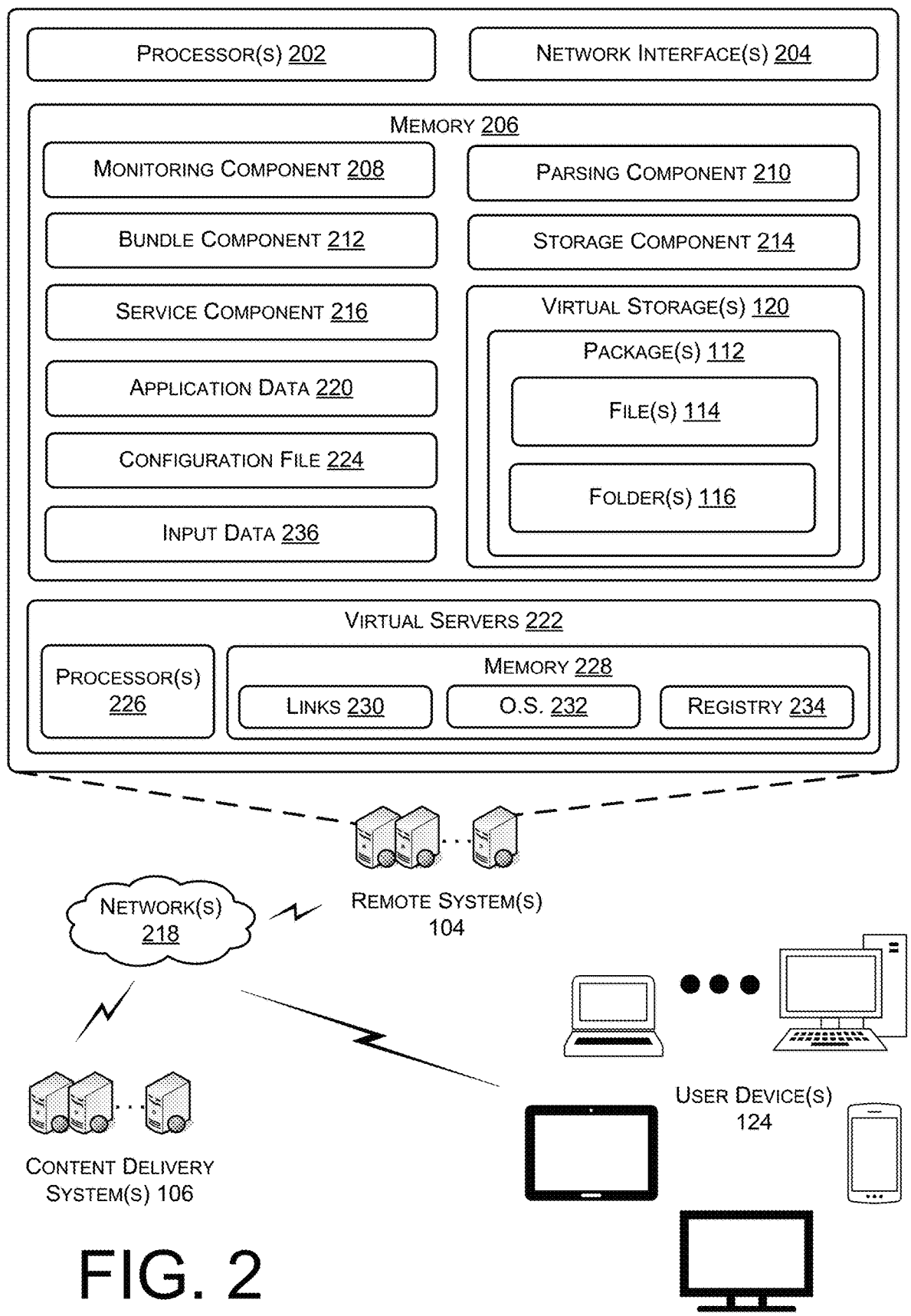
FIG. 2 illustrates a block diagram of an example architecture of remote system(s), in accordance with examples of the present disclosure.

FIG. 2 illustrates a block diagram of an example architecture of the remote system(s) 104, in accordance with examples of the present disclosure. As shown, the remote system(s) 104 include at least one or more processors 202, one or more network interfaces 204, and memory 206.

Additionally, the remote system(s) 104 may store, in the memory 206, a monitoring component 208, a parsing component 210, a bundle component 212, a storage component 214, and a service component 216. However, in other examples, the remote system(s) 104 may include more or less components than the components 208-216 illustrated in the example of FIG. 2. For example, two or more of the components 208-216 may be combined into a single component.

The monitoring component 208 may be configured to monitor the installing, launching, and/or terminating of a network application. For example, the remote system(s) 104 may begin to install, from the content delivery system(s) 106 and over network(s) 218, a network application, where the network application may be represented by application data 220. In some examples, the remote system(s) 104 install the network application onto a virtual server 222 associated with the network application. After installing the network application, the remote system(s) 104 may then launch the network application, such as on the virtual server 222, followed by terminating the network application.

In some examples, and as illustrated in the example of FIG. 4, the remote system(s) 104 use a configuration file 224 that includes processes that the remote system(s) 104 execute while the network application is being installed, launched, and/or terminated. For instance, the configuration file 224 may include a first process that includes first parameters, a second process that includes second parameters, a third process that includes third parameters, and/or so forth associated with the network application. For example, the configuration file may include at least first process(es) associated with downloading the network application, followed by second process(es) associated with starting the monitoring and recording of events, followed by third process(es) associated with installing the network application, followed by fourth process(es) associated with launching the network application, followed by fifth process(es) associated with terminating the network application, followed by sixth process(es) associated with stopping the monitoring. In some examples, the configuration file 224 may further include an identifier associated with the network application, a username, credentials, and/or any other information that the remote system(s) 104 use to identify, download, and/or install the network application.

In some examples, the remote system(s) 104 may receive, from a user device 124, information for creating the configuration file 224. For example, a user of the user device 124 may input the processes that are to be executed and/or the parameters for the processes. The remote system(s) 104 may then use the information to generate the configuration file 224. As described herein, the remote system(s) 104 may then use this configuration file to generate the software package 112 for the network application.

For instance, the monitoring component 208 may be monitoring the installing, launching, and/or terminating of the network application in order to identify events associated with the installing, launching, and/or terminating. As described herein, the events may include each of the processes that were created and/or executed using processes from the configuration file 224. In some example, the monitoring component 208 may then be configured to generate a log file 114 that includes each of the events. For each event, and as illustrated in the example of FIG. 5, the log file 114 may include at least a process type, a process name, a process identifier, a path for the process (e.g., the file location for the process), a child process identifier, an event number, and/or any other information.

In some examples, the monitoring component 208 may correspond to a process monitor tool that shows real-time file system, registry, service, and process/thread activity. For example, and for each process, the monitoring component 208 may be configured to reliably capture the process details, including the image path, the command line, the user identifier, the session identifier, and/or any other additional information associated with the respective process. As the monitoring component 208 is monitoring for the events, the monitoring component 208 may be generating the log file 114 that includes the events as well as the information associated with the events.

The parsing component 210 may be configured to analyze the log file 114 in order to identify events. In some examples, the parsing component 210 may be configured to identify specific types of events, such as writing events. For example, the parsing component 210 may be configured to identify file writing events, register key writing events, registry entry writing events, service writing events, and/or the like. The parsing component 210 may also be configured to generate file(s) 114 based on the parsing. As described herein, the files 114 that the parsing component 210 creates may include at least the events file 114 that includes one or more of the events that are associated with software files of the network application, the registry file 114 that includes one or more of the events that are associated with registering the network application, and/or the service file 114 that includes one or more of the events that are associated with service(s) for network application. Each of the events file 114, the registry file 114, and the service file 114 are illustrated in FIG. 6, FIG. 7, and FIG. 8, respectively.

The bundle component 212 may be configured to generate the software package 112 associated with the network application. For example, the bundle component 212 may be configured to generate the software package to the include the file(s) 114 described above. The bundle component 212 may further be configured to use the file(s) 114 in order to retrieve the software files associated with the network application, copy the software files, and then store the copies of the software files into the folder(s) 116 of the software package 112. In some examples, the bundle component 212 stores the software files using a same structure (e.g., tree structure) as the software files that were stored on the virtual server 222 during installation of the network application. In order to store the software files using the same structure, the bundle component 212 may be configured to analyze the events file 114 in order to determine the respective location (e.g., the respective path) to each of the software files. The bundle component 212 may then be configured to store the software files in similar locations within the folder(s) 116.

The storage component 214 may be configured to generate the virtual storage device 120 associated with the network application. As described herein, a user may input, into a user interface, information for creating the virtual storage device 120. The remote system(s) 104 may then receive, from a user device 124, data representing the information input into the user interface. The storage component 214 may then be configured to analyze the information in order to generate the virtual storage device 120 for the software package 112. For example, the storage component 214 may generate the virtual storage device 120 such that the virtual storage device 120 includes a type as specified in the information. Additionally, the storage component 214 may generate the virtual storage device 120 such that the virtual storage device 120 includes the size specified by the information. After generating the virtual storage device 120, the storage component 214 may be configured to store the software package 112 in the virtual storage device 120.

The storage component 214 may further be configured to generate additional virtual storage devices 120 associated with the network application. For example, the storage component 214 may be configured to generate copies of the software package 112 stored on the virtual storage device 120. The storage component 214 may also be configured to generate additional virtual storage devices 120 associated with the network application and then store the copies of the software package 112 on the additional virtual storage devices 120. In other words, the storage component 214 may use the original software package 112 in order to generate any number of virtual storage devices 120 that include copies of the software package 112 for the network application. This way, the remote system(s) 104 are able to quickly install the network application on multiple virtual servers 222.

For example, the service component 216 may be configured to associate the virtual storage devices 120 with the virtual servers 222. As described above, a virtual server 222 may include a server (e.g., computer and server programs) that executes at a remote location, from the user devices 124, and is used to run applications. For example, the virtual server 222 may include one or more dedicated computing resources, such as CPUs 226, memory 228, storage, network capacity, and/or the like for running and providing the network application. For instance, after the service component 216 associates the virtual storage devices 120 with the virtual servers 222, the install files 114 of the software packages 112 may begin to install the network application onto the virtual servers 222.

For example, and for a virtual server 222, the install file 114 may cause a program from an EXE file 114 to create links 230 that point to the software files stored in the folder(s) 116 of the software package 112. As described herein, in some examples, the links 230 may include, but are not limited to, junctions, symlinks, and/or any other type of file that points to the locations of the software files on the virtual storage device 120. The program may then store the links 230 on a drive of the virtual server 222. In some examples, the program stores the links 230 based on the locations of the software files within the drive of the software package 112 (e.g., store the links 230 using the same structure as the software files are stored on the drive). For example, and for a software file, the program may store the links 230 for the software file using the path for the software file as specified by the events file 114. By generating and storing the links 230, all of the software files associated with the network application are not required to be copied and installed onto the virtual server 222.

Additionally, the program may iterate through all of the register keys from the key file 114 and make command(s) to the operating system 232 of the virtual server 222, where each command is to create a key and store the value associated with the key, at the key type, in a registry 234 of the virtual server 222. The program may perform similar processes for each of the services. For example, the program may iterate through all of the services from the service file 114 and make command(s) to the operating system 232 of the virtual server 222, where each command is to create a service and then store the data associated with the service in a service registry 234. In some examples, after this is complete, the network application is installed on the virtual server 222 and ready to launch the game for a user.

As described above, in some examples, the remote system(s) 104 may perform similar processes in order to generate and associate additional virtual storage devices 120 with the virtual servers 222. For example, and for the network application, the monitoring component 208 may be configured to monitor the installing, launching, and/or terminating of a related network application (e.g., a client application), that is associated with the network application, in order to identify events. In some examples, the monitoring component 208 is configured to generate a log file 114 that includes the events. Next, the parsing component 210 may be configured to analyze the log file 114 in order to identify specific types of events and then generate the various files (e.g., the events file 114, the registry file 114, the server file 114, etc.) that include the specific types of events. Additionally, the bundle component 212 may be configured to generate an additional software package 112 for the related network application.

For example, the bundle component 212 may be configured to store the files 114 in the additional software package 112. The bundle component 212 may also be configured to copy all of the software files 114 that were installed during the installation and store the copies of the software files 114 in folder(s) 116 of the additional software package 112. Additionally, the bundle component 212 may be configured to generate the install file 114 and the launch file 114 for the related network application and store the install file 114 and the launch file 114 in the additional software package 112.

Next, the storage component 214 may be configured to perform the processes described above in order to generate additional virtual storage devices 120 for the related network application. Additionally, the storage component 214 may be configured to copy the additional software package 112 and store a respective additional software package 112 on each of the additional virtual storage devices 120. The service component 216 may then be configured to associate the additional virtual storage devices 120 with the virtual servers 222. In some examples, the associating of the additional virtual storage devices 120 with the virtual servers 222 then causes the related network application to also be installed onto the virtual servers 222 with the network application.

In some examples, the remote system(s) 104 may perform such processes for certain types of network applications, such as network games. For example, the network games may require a related application that runs in the background in order to launch the network games. As such, the remote system(s) 104 may associate the virtual storage devices 120 that are associated with the related application with all of the virtual servers 222 for all of the network games. Additionally, the remote system(s) 104 may associate the virtual storage devices 120 for each network game with the virtual servers 222 that are created specifically for the respective network games. In other words, the virtual storage devices 120, which include the software packages 112 for the related application, may be used for all of the virtual servers 222. However, specific virtual storage devices 120, which include respective software packages 112 for specific network games, may only be used for the virtual servers 222 that are associated with the respective network games.

As described above, after the network application (and/or one or more additional network applications) are installed on the virtual servers 222, the virtual servers 222 are ready to launch the network application for users. For instance, the remote system(s) 104 may receive, from a user device 124 and over network(s) 218, input data 236 representing a request to access the network application. For example, if the network application includes a network game, the input data 236 may represent a request to play the network game. Based on the request, the remote system(s) 104 may then assign the user device 124 to a virtual server 222 associated with the network application. For example, the remote system(s) 104 may store data indicating that the user device is assigned to the virtual server 222. The virtual server 222 may then execute the launch file 114 stored in the software package 112, which causes the launching of the network application for the user.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance. CRSM may include random access memory ("RAM") and Flash memory. In other instances. CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington. USA: the Windows operating system from Microsoft Corporation of Redmond. Washington. USA: LynxOS as promulgated by Lynx Software Technologies. Inc. of San Jose, California: Operating System Embedded (Enea OSE) as promulgated by ENEA AB of Sweden; and so forth.

Network Interface(s) may enable communication of data between the electronic device and one or more other remote systems, as well as other networked devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 3:
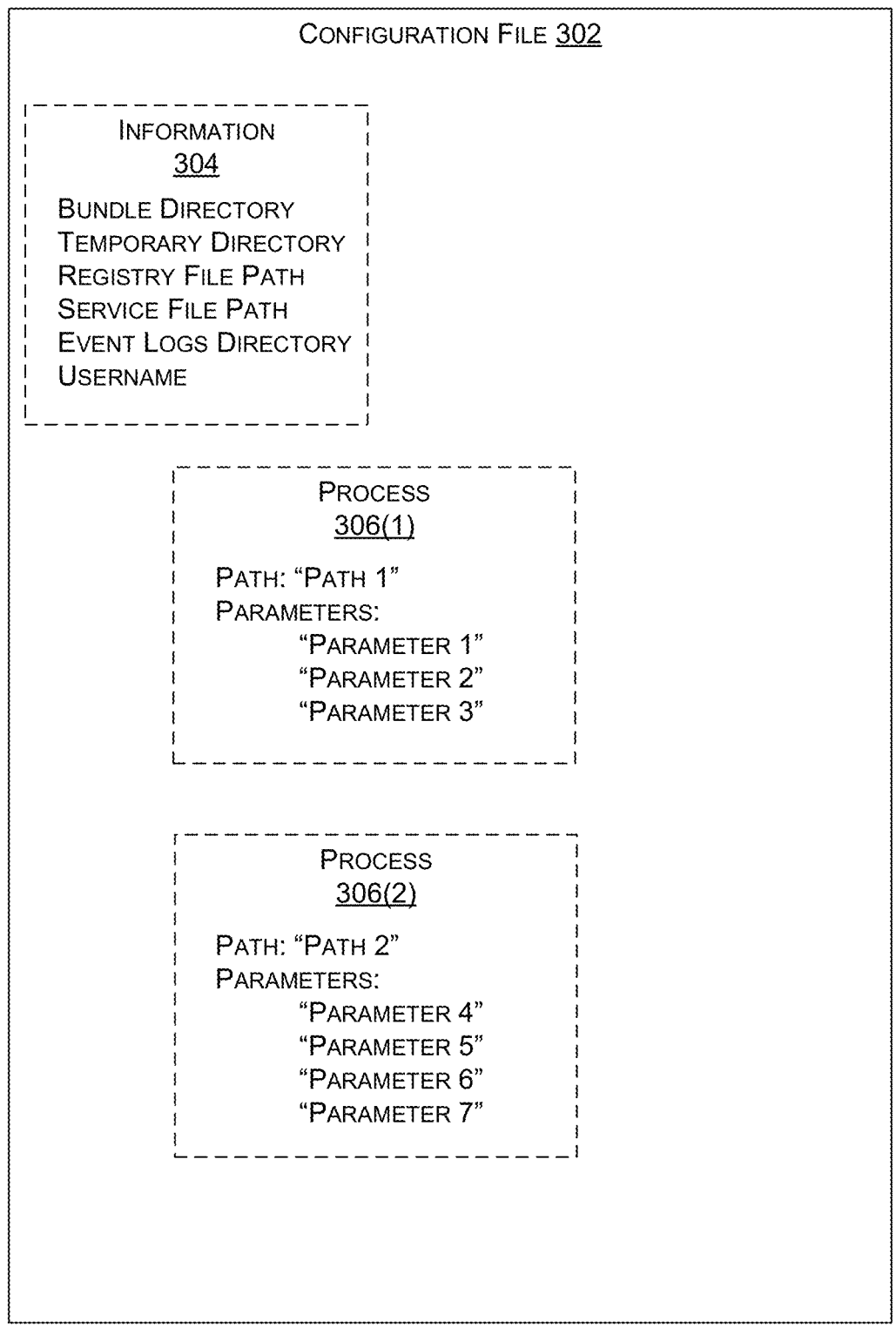
FIG. 3 illustrates an example of a configuration file, in accordance with examples of the present disclosure.

FIG. 3 illustrates an example of a configuration file 302, in accordance with examples of the present disclosure. As shown, the configuration file 302 may include information 304 which, as described above, may be input by a user. The information 304 may include at least a path for a bundle directory file, a path for a temporary directory file, a path to a registry file, a path to a service file, a path to a log file, and a username. While this is just one example of the information 304 that may be included in the configuration file 302, in other examples, the configuration file 302 may include additional and/or alternative information.

As further illustrated in the example of FIG. 3, the configuration file 302 may include a number of processes 306(1)-(2) (also referred to as "process 306" or "processes 306"). For each process 306, the configuration file 302 may include a path to a file (e.g., an EXE file) associated with the process and parameters for executing the process 306. In some examples, and as described above, the remote system(s) 104 execute the configuration file 224 to create the software package 112. For example, the remote system(s) 104 may initially execute the first process 306(1), which includes a path to a first file associated with the first process 306(1) along with first parameters for the first process 306(1). After executing the first process 306(1), the remote system(s) 104 may execute the second process 306(2), which includes a path to a second file associated with the second process 306(2) and second parameters for the second process 306(2).

While the example of FIG. 3 illustrates the configuration file 302 as including one program, in other examples, the configuration file 302 may include any number of programs. For example, the configuration file 302 may include a first program for installing the network application, a second program for launching the network application, a third program for terminating the network program, and/or any other programs needed to perform the processes described herein. Additionally, while the example of FIG. 3 illustrates the program as including only two processes 306, in other examples, the program may include any number of processes 306.

Based at least in part on executing the configuration file 302, the remote system(s) 104 may generate the software package 112. As such, FIG. 4 illustrates an example file structure 402 for the software package 112, in accordance with examples of the present disclosure. In the example of FIG. 4, the file structure 402 includes names 404 of the files 114 and the folders 116, types 406 of the files 114 and the folders 116, dates 408 that the files 114 and the folders 116 were last modified, sizes 410 of the files 114 and the folders 116, and storage classes 412 associated with the files 114 and the folders 116.

As shown, the file structure 402 includes at least a device folder 414 that stores the software files for the network application, a log file 416 that includes all of the events, an events file 418 that includes events that are associated with software files of the network application, a registry file 420 that includes events that are associated with registering the network application, a service file 422 that includes events that are associated with service(s) for network application, an install file 424 for installing the network application, a launch file 426 for launching the network application, and a program file 428 that is configured to perform the installation processes described herein. As described above, the type 406 of file 114 may include, but is not limited to, a JSON file, a Batch file, a HTML file, an XML file, an EXE file, a log file, a zip file, and/or any other file format type.

As further shown by the example of FIG.

FIG. 5 illustrates an example of the log file 416, in accordance with examples of the present disclosure. As shown, the log file 416 includes information about events 502(1)-(4) (also referred to as "event 502" or "events 502") identified by the monitoring component 208. For each event 502, the log file 416 may include at least a type (e.g., file event, service event, registry event, etc.) of the event 502, a name of the process that caused event 502, a process identifier for the process, a path to the process, a child process identifier associated the process, and an event number associated with the event 502. In some examples, one or more of the type, the name, the process identifier, the path, and/or the child process identifier may be the same for more than one event 502. For example, if the second event 502(2) and the third event 502(3) are associated with the same process, then at least the type, the name, and the process identifier may the same for both the second event 502(2) and the third event 502(3).

While the example of FIG. 5 illustrates information that the log file 416 may include for the events 502, in other examples, the log file 416 may include additional and/or alternative information. Additionally, while the example of FIG. 5 illustrates the log file 416 as including four events 502, in other examples, the log file 416 may include any number of events 502.

FIG. 6 illustrates an example of the events file 418, in accordance with examples of the present disclosure. As shown, the events file 418 includes information about events 602(1)-(4) (also referred to as "event 602" or "events 602"), from the events 502, that are associated with the software files of the network application. For each event 602, the events file 418 may include at least a type (e.g., file event) of the event 602, a name of the process that caused event 602, a process identifier associated with the process, a path to the process, and an event number associated with the event 602. In some examples, one or more of the type, the name, the process identifier, and/or the path may be the same for more than one event 602. For example, if the second event 602(2) and the third event 602(3) are associated with the same process, then at least the type, the name, and the process identifier may the same for both the second event 602(2) and the third event 602(3).

While the example of FIG. 6 illustrates information that the events file 418 may include for the events 602, in other examples, the events file 418 may include additional and/or alternative information. Additionally, while the example of FIG. 6 illustrates the events file 418 as including four events 602, in other examples, the events file 418 may include any number of events 602.

As discussed above, the bundle component 212 may be configured to copy the software files that were installed during installation of the network application. In some examples, the bundle component 212 may use the events file 418 to perform the copying. For example, the bundle component 212 may analyze the events file 418 in order to identify each of the software files as well as the respective path to each of the software files. The bundle component 212 may then use the paths to retrieve and copy the software files. Additionally, the bundle component 212 may be configured to use the events file 418 to store the copied software files within the software package 112. For example, since the bundle component 212 may store the copied software files using the same structure as the original software files, the bundle component 212 may use the paths to determine the structure for storing the copied software files.

For example, the bundle component 212 may store the copied software file that is associated with the first event according to "Path 1" within the software package 112. Additionally, the bundle component 212 may store the copied software file that is associated with the second event according to "Path 11" within the software package 112. The bundle component 212 may then perform similar processes for each of the other files.

Additionally, in some examples, the remote system(s) 104 (e.g., the install program) may use the events file 418 when installing the network application on the virtual server 222. For example, and as discussed above, the remote system(s) 104 may generate and then store the links 230 that point to the software files on the virtual storage device 120. As such, the remote system(s) 104 may generate the links 230 using the events file 418. For example, and for a link 230 that points to a software file, the remote system(s) 104 may generate the link based on the path, from the events file 418, for the software file (e.g., the pointer includes the path).

Additionally, in some examples, the remote system(s) 104 may store the links 230 on the virtual server 222 based on the paths. For example, the remote system(s) may store the links 230, on the virtual server 222, using a same structure (e.g., tree structure) as the software files are stored on the virtual storage device 120. For example, the remote system(s) 104 may store the software files in a drive of the virtual server 222, such as a "C" drive, using a similar structure as the software files were stored in a related drive on the virtual storage device 120. This way, the remote system(s) 104 are able to install the network application on the virtual sever 222 without having to copy and store each software file.

FIG. 7 illustrates an example of the registry file 420, in accordance with examples of the present disclosure. As shown, the registry file 420 includes information about events 702(1)-(4) (also referred to as "event 702" or "events 702"), from the events 502, that are associated with the registering the network application. For each event 702, the registry file 420 may include at least a type of event 702 (e.g., registry event), a name of the process that caused event 702, a process identifier associated with the process, a path to the process, and an event number associated with the event 702. In some examples, one or more of the type, the name, the process identifier, and/or the path may be the same for more than one event 702. For example, if the second event 702(2) and the third event 702(3) are associated with the same process, then at least the type, the name, and the process identifier may the same for both the second event 702(2) and the third event 702(3).

While the example of FIG. 7 illustrates information that the registry file 420 may include for the events 702, in other examples, the registry file 420 may include additional and/or alternative information. Additionally, while the example of FIG. 7 illustrates the registry file 420 as including four events 702, in other examples, the registry file 420 may include any number of events 702.

FIG. 8 illustrates an example of the service file 422, in accordance with examples of the present disclosure. As shown, the service file 422 includes information about events 802(1)-(4) (also referred to as "event 802" or "events 802"), from the events 502, that are associated with the services for the network application. For each event 802, the service file 422 may include at least a type of event 802 (e.g., service event), a name of the process that caused event 802, a process identifier associated with the process, a path to the process, a name of the service, and an event number associated with the event 802. In some examples, one or more of the type, the name of the process, the process identifier, the path, and/or the name of the service may be the same for more than one event 802. For example, if the second event 802(2) and the third event 802(3) are associated with the same service, then at least the type, the name of the process, the process identifier, and/or the name of the service may be same for both the second event 802(2) and the third event 802(3).

While the example of FIG. 8 illustrates information that the service file 422 may include for the events 802, in other examples, the service file 422 may include additional and/or alternative information. Additionally, while the example of FIG. 8 illustrates the service file 422 as including four events 802, in other examples, the service file 422 may include any number of events 802.

As illustrated by the examples of FIGS. 5-8, the log file 416 may include all of the events 502 that occurred during the installation, launching, and/or termination of the network application. The remote system(s) 104 (e.g., the parsing component 210) may then parse through the log file 416 in order to identify the file events 602, the registry events 702, and the service events 802 from the events 502. Additionally, the remote system(s) 104 (e.g., the parsing component 210) may then generate the events file 418 that includes the file events 602, the registry file 420 that includes the registry events 702, and the service file 422 that includes the service events 802. The remote system(s) 104 are then able to use at least the events file 418, the registry file 420, and the service file 422 when installing the network application on the virtual server(s) 222.

FIG. 9 illustrates an example of a key file 902 that may be included in the software package 112, in accordance with examples of the present disclosure. As shown, the key file 902 includes information about keys 904(1)-(4) (also referred to as "key 904" or "keys 904") that are associated with registering the network application. For each key 904, the key file 902 may include at least the key 904, a value for the key 904, a type of the key 904, and data for the key 904. In some examples, one or more of the key 904, the value, the type, and/or the data may be the same for more than one key 904.

As described above, during installation of the network application onto a virtual server 222, the program may iterate through all of the register keys 904 from the key file 902 and make command(s) to the operating system 232 of the virtual server 222, where each command is to create a key 904 and store the value associated with the key 904, at the key type, in the registry 234 of the virtual server 222.

Figure 10A:
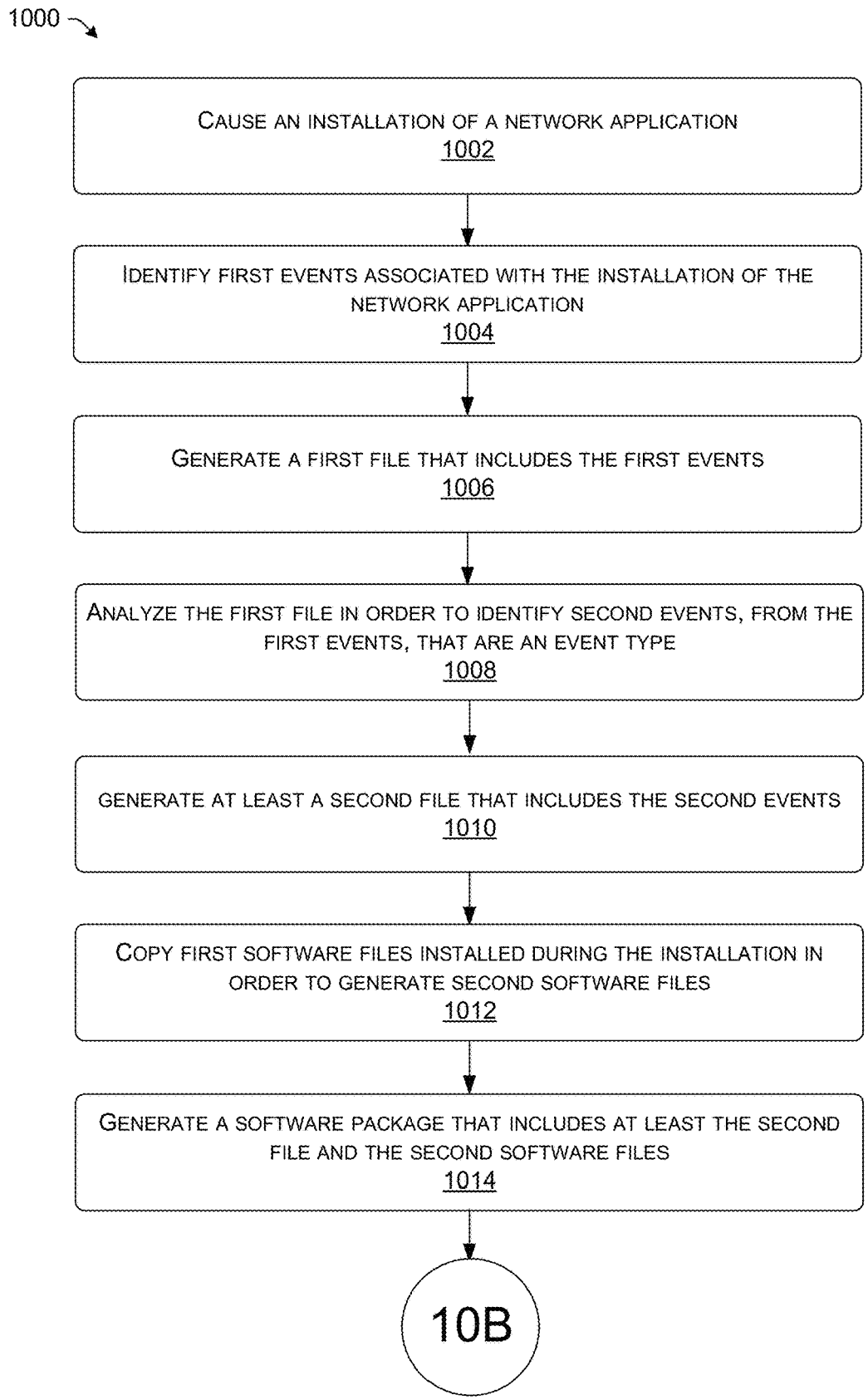
FIGS. 10A-10B illustrate an example process for generating a virtual storage device that includes a software package associated with a network application and then using the virtual storage device to install the network application onto a virtual server, in accordance with examples of the present disclosure.
Figure 10B:
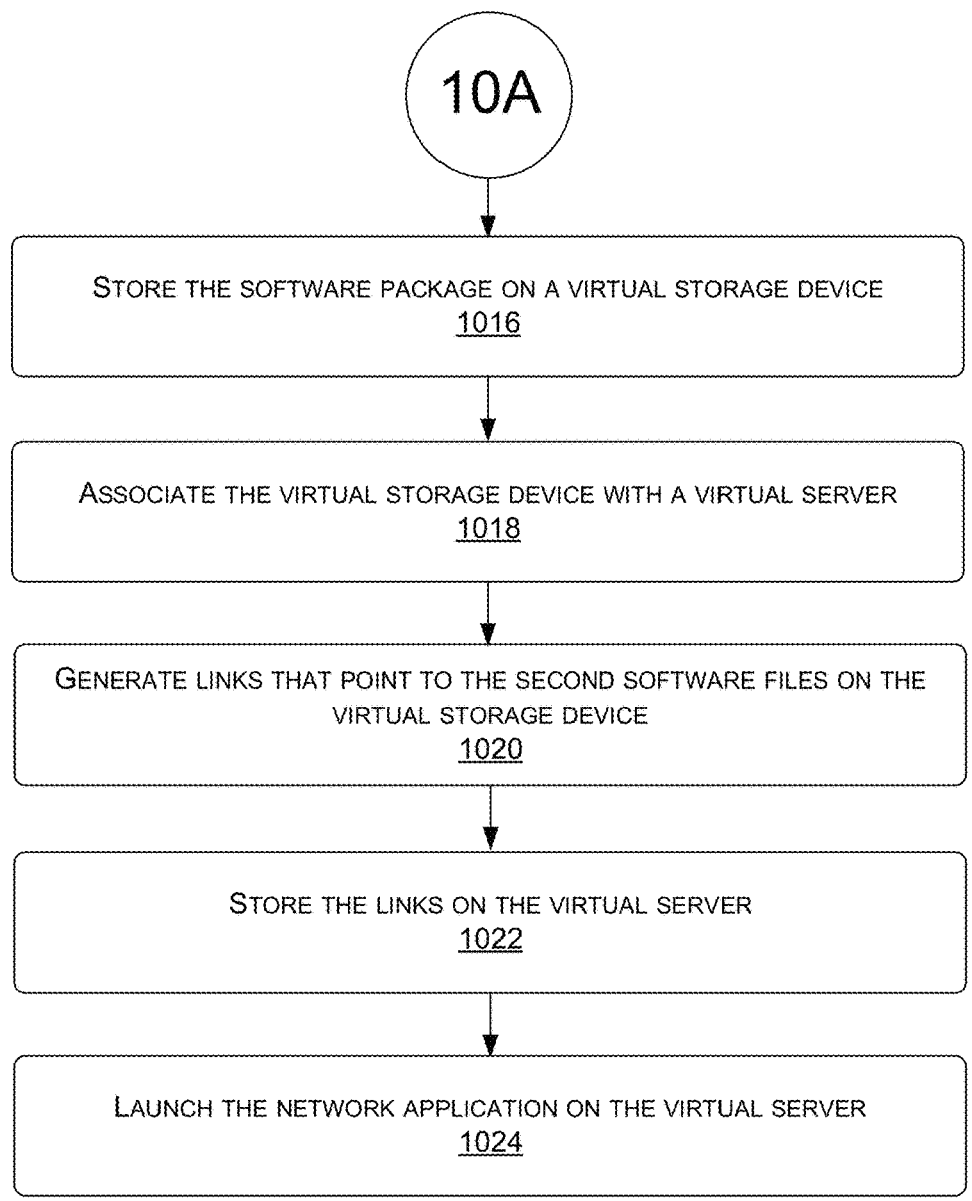
Figure 11:
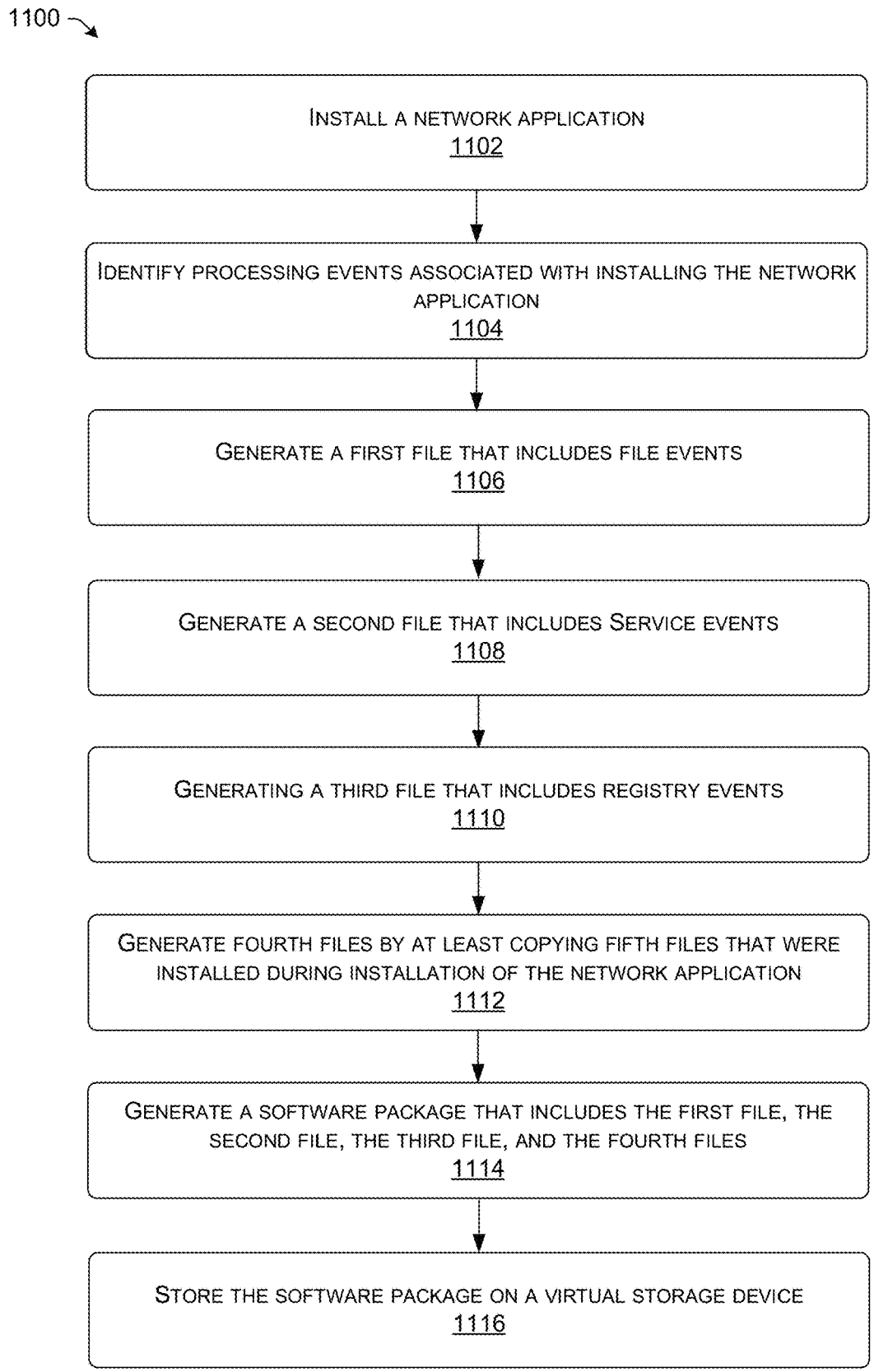
FIG. 11 illustrates an example process for generating a virtual storage device that includes a software package associated with a network application, in accordance with examples of the present disclosure.

FIGS. 10-11 illustrate various processes for providing network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 10A-10B illustrate an example process 1000 for generating a virtual storage device that includes a software package associated with a network application and then using the virtual storage device to install the network application onto a virtual server, in accordance with examples of the present disclosure. At 1002, the process 1000 may include causing an installation of a network application and at 1004, the process 1000 may include identifying first events associated with the installation of the network application. For instance, the remote system(s) 104 may install the network application, such as on a virtual server. While installing the network application, the remote system(s) 104 may identify the first events associated with the installation. In some examples, the first events may include file events, registry events, service events, and/or any other type of processing events.

At 1006, the process 1000 may include generating a first file that includes the first events and at 1008, the process 1000 may include analyzing the first file in order to identify second events, from the first events, that are an event type. For instance, the remote system(s) 104 may generate the first file (e.g., a log file) that includes the first events. After generating the first file, the remote system(s) 104 may analyze the first file in order to identify the second events that are the event type. For example, the remote system(s) 104 may analyze the first file in order to identify the file events, the registry events, and/or the service events.

At 1010, the process 1000 may include generating at least a second file that includes the second events. For instance, the remote system(s) 104 may then generate the at least the second file that includes second events. For example, the remote system(s) 104 may generate a file, such as an events file, that includes the file events. The remote system(s) 104 may also generate a file, such as a registry file, that includes the registry events. Furthermore, the remote system(s) 104 may generate a file, such as a service file, that includes the service events.

At 1012, the process 1000 may include copying first software files installed during the installation in order to generate second software files and at 1014, the process 1000 may include generating a software package that includes at least the second file and the second software files. For instance, the remote system(s) 104 may use the second file, such as the events file, to identify the first software files. The remote system(s) 104 may then copy each of the first software files in order to generate the second software files. Next, the remote system(s) 104 may generate the software package that includes at least the second file and the second software files. In some examples, the software package corresponds to a bundle that includes the second file and the second software files.

At 1016, the process 1000 may include storing the software package on a virtual storage device. For instance, the remote system(s) 104 may generate the virtual storage device for the network application. In some examples, the remote system(s) 104 generate the virtual storage device using information received from a user device. The remote system(s) 104 may then store the software package on the virtual storage device. In some examples, to store the software package, the remote system(s) 104 initially make a copy of the software package and then store the copy of the software package on the virtual storage device. In some examples, the remote system(s) 104 make multiple copies of the software package and store each of the copies of the software package on a respective virtual storage device.

At 1018, the process 1000 may include associating the virtual storage device with a virtual server and at 1020, the process 1000 may include generating links that point to the second software files on the virtual storage device. For instance, the remote system(s) 104 may associate the virtual storage device with the virtual server. In some examples, the remote system(s) 104 perform the association by virtually attaching the virtual storage device to the virtual server. Based on the association, the remote system(s) 104 may cause the generation of the links that point to the second software files. After generating the links, and at 1022, the process 1000 may include storing the links on the virtual server. For instance, the remote system(s) 104 may then cause the links to be stored on the virtual server.

At 1024, the process 1000 may include launching the network application. For instance, the remote system(s) 104 may then receive, from a user device, a request to access the network application on the virtual server. In some examples, such as when the network application is a network game, the request may be to play the network game. The remote system(s) 104 may then assign the virtual server to the user device. Additionally, the remote system(s) 104 may cause a launching of the network application on the virtual server.

FIG. 11 illustrates an example process 1100 for generating a virtual storage device that includes a software package associated with a network application, in accordance with examples of the present disclosure. At 1102, process 1100 may include installing a network application onto the first virtual server and at 1104, the process 1100 may include identifying processing events associated with installing the network application. For instance, remote system(s) 104 may cause the installation of the network application onto a virtual server. During the installation, the remote system(s) 104 may monitor the installing of the network application in order to identify the processing events. Additionally, in some examples, the remote system(s) 104 may monitor a launching and/or terminating of the network application to identify the processing events.

At 1106, the process 1100 may include generating a first file that includes file events and at 1108, the process 1100 may include generating a second file that includes service events. For instance, the remote system(s) 104 may parse through a file that includes the processing events. Based on the parsing, the remote system(s) 104 may identify the file events and the service events from the processing events. The remote system(s) 104 may then generate the first file that includes the file events and generate the second file that includes the service events.

At 1110, the process 1100 may include generating a third file that includes registry events. For instance, the remote system(s) 104 may further parse through the file to identify the registry events from the processing events. The remote system(s) 104 may then generate the third file that includes the registry events. In some examples, the remote system(s) 104 may further generate a key file that includes the keys associated with the registry events. Additionally, in some examples, the remote system(s) 104 may generate an install file that includes command(s) to install the network application and/or a launch file that includes command(s) to launch the network application.

At 1112, the process 1100 may include generating fourth files by at least copying fifth files that were installed during installation of the network application. For instance, the remote system(s) 104 may identify the fifth files that were installed for the network application. In some examples, the remote system(s) 104 identify the fifth files using the first file that includes the file events. The remote system(s) 104 may then generate the fourth files by copying the fifth files.

At 1114, the process 1100 may include generating a software package that includes the first file, the second file, the third file, and the fourth files and at 1116, the process 1100 may include storing the software package on a virtual storage device. For instance, the remote system(s) 104 may generate the software package that includes at least the first file, the second file, the third file, and the fourth files. In some examples, the software package further includes the key file, the install file, and/or the launch file. The remote system(s) 104 may then store the software package on the virtual storage device. Additionally, the remote system(s) 104 may then make copies of the virtual storage device and use the copies to install the network application on virtual servers.

Figure 12:
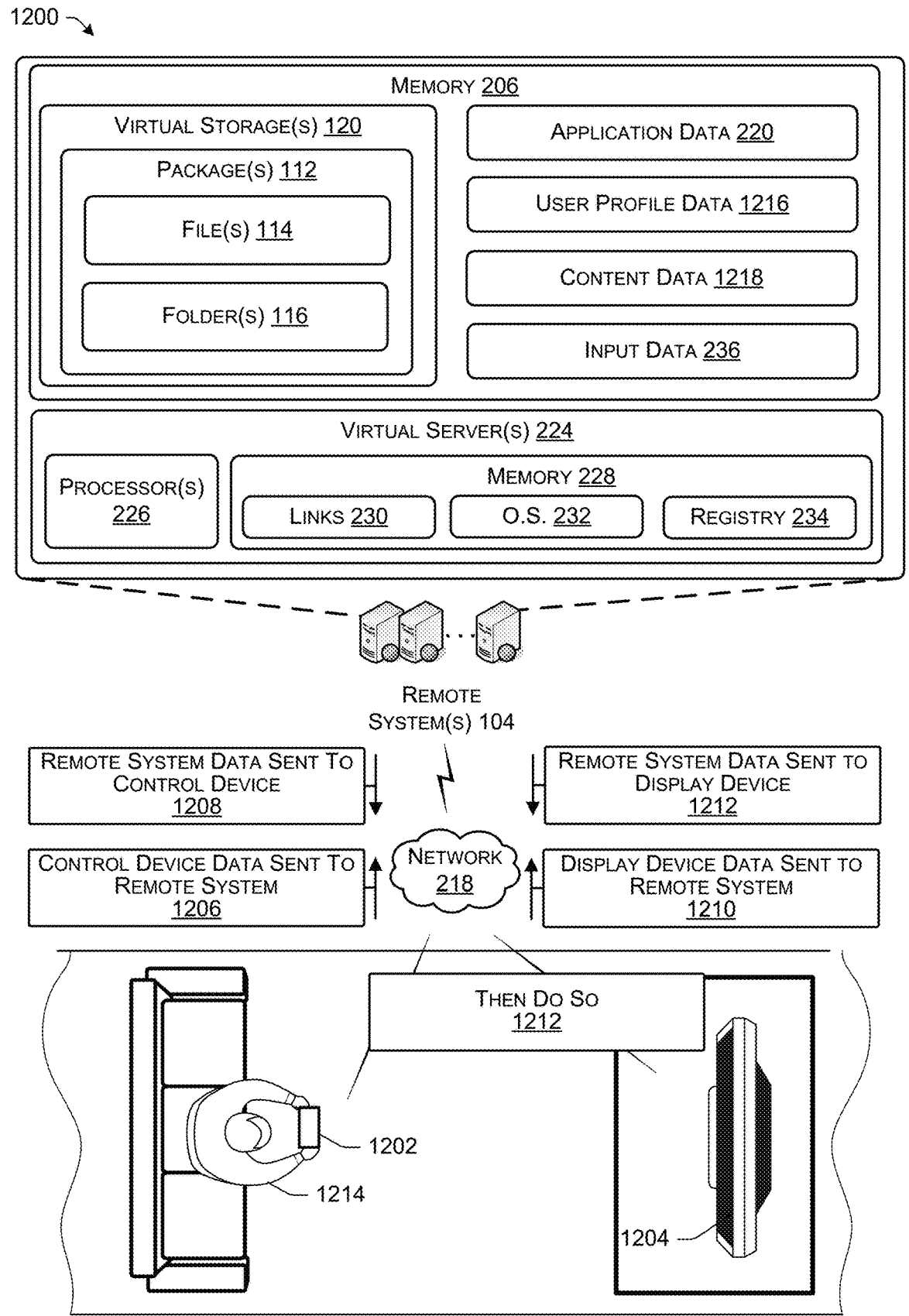
FIG. 12 illustrates a schematic diagram of an example system for controlling network applications, in accordance with examples of the present disclosure.

FIG. 12 is a schematic diagram of an example system 1200 for controlling network applications, in accordance with examples of the present disclosure. The system 1200 may include, for example, the remote system(s) 104, a control device 1202, and a display device 1204. In the example of FIG. 12, the control device 1202 may communicate with the remote system(s) 104 over the network(s) 218, such as by using a first communication channel. For instance, the control device 1202 may send data to the remote system(s) 104 (which is represented by 1206) and the remote system(s) 104 may send data to the control device 1202 (which is represented by 1208). Additionally, the display device 1204 may communicate with the remote system(s) 104 over the network(s) 218, such as by using a second communication channel. For instance, the display device 1204 may send data to the remote system(s) 104 (which is represented by 1210) and the remote system(s) 104 may send data to the display device 1204 (which is represented by 1212).

By sending and receiving data with the control device 1202 and the display device 1204, the remote system(s) 104 allow a user 1214 to control, via the remote system(s) 104, the network application being displayed by the display device 1204 using the control device 1202. For instance, the control device 1202 may connect to the network(s) 218, such as by using configuration settings. The control device 1202 may then send, to the remote system(s) 104, identifier data representing at least an identifier associated with the control device 1202. The remote system(s) 104 may receive the data and determine, using user profile data 1216, that the data is received from the control device 1202. For example, the remote system(s) 104 may match the identifier represented by the data received from the control device 1202 with an identifier associated with the user profile data 1216. Based at least in part on the match, the remote system(s) 104 may determine that the data was sent from the control device 1202.

The remote system(s) 104 may further determine, using the user profile data 1216, that the control device 1202 is associated with at least the display device 1204. For example, and based at least in part on determining that the data was sent from the control device 1202, the remote system(s) 104 may analyze the user profile data 1216 associated with the user 1214. The remote system(s) 104 may then determine that the user profile data 1216 includes and/or is associated with data representing an identifier of the display device 1204. Based at least in part on the determination, the remote system(s) 104 may determine that the control device 1202 is associated with the display device 1204.

In some instances, the remote system(s) 104 may then send, to the display device 1204, content data 1218 (e.g., video data, audio data, etc.) representing one or more network applications that are available to the user 1214. In some instances, the one or more network applications may include one or more applications that have been acquired by the user 1214 (e.g., the one or more network applications represented by the application data 220). Additionally, or alternatively, in some instances, the one or more network applications may include one or more network applications that are free to users. In either example, the display device 1204 may receive the content data 1218 from the remote system(s) 104. The display device 1204 may then display image(s) that represent the one or more network applications that are available to the user 1214. For example, the image(s) may include one or more identifiers (e.g., one or more names) of the one or more network applications that are available to the user 1214.

The remote system(s) 104 may then receive, from the control device 1202, input data 236 representing input(s) received by the control device 1202. The remote system(s) 104 may analyze the input data 236 to identify a network application that is selected by the user 1214. For example, the input(s) may correspond to movement(s) of an object, such as a cursor, across the image(s) representing the one or more network applications. The input(s) may further correspond to a selection of one of the network applications (e.g., a selection of a control on the control device 1202 when the object is located over the selected network application). The remote system(s) 104 may then determine, based at least in part on the selection, that the user 1214 selected the network application.

The remote system(s) 104 may then assign the control device 1202 and/or the display device 1204 with a virtual server 222 associated with the network application. Additionally, the remote system(s) 104 may cause a launching of the network application on the virtual server 222. In some examples, the launching of the network application occurs using the launch file that includes the command(s) associated with launching the network application. Once the network application is launched, the remote system(s) 104 are able to provide content associated with the network application.

For example, the remote system(s) 104 may then send, to the display device 1204, content data 1218 representing a first state of the network application. The content data 1218 may include first video data representing image(s) of the first state of the network application, first audio data representing sound corresponding to the first state of the network application, and/or first timestamp data representing a time for displaying the image(s) and/or a time for outputting the sound. The display device 1204 may receive the content data 1218 from the remote system(s) 104. Using the first video data, the display device 1204 may display the image(s) representing the first state of the network application. For example, if the network application includes a gaming application, the display device 1204 may display content representing the first state of the game. In the example of FIG. 12, the first state of the game may include an object (e.g., a character) located at a first position in a gaming environment (e.g., a forest). In some instances, the display device 1204 may further output the sound represented by the first audio data.

In some instances, the display device 1204 displays the image(s) and/or outputs the sound according to the time(s) represented by the first timestamp data. For example, the display device 1204 may determine when a current time includes the time represented by the first timestamp data for displaying the first video data. Based at least in part on the determination, the display device 1204 may begin displaying the image(s) representing the first state of the network application. Additionally, the display device 1204 may determine when a current time includes the time represented by the first timestamp data for outputting the sound. Based at least in part on the determination, the display device 1204 may begin outputting the sound represented by the first audio data.

In some instances, the remote system(s) 104 may additionally send, to the control device 1202, content data 1218 representing the first state of the network application. The content data 1218 may include second audio data representing sound corresponding to the first state of the network application and/or second timestamp data representing a time for outputting the sound. The control device 1202 may then output the sound represented by the second audio data. In some instances, the control device 1202 may output the sound according to the time represented by the second timestamp data. In some instances, first timestamp data and/or the second timestamp data synchronizes the outputting of the sound by the control device 1202 with the displaying of the image(s) by the display device 1204.

The user 1214 can then use the control device 1202 to provide inputs to the network application. For instance, the control device 1202 may receive an input, such as a selection of a button, joystick, key, touch-sensitive pad, sensor, and/or the like associated with the control device 1202. The control device 1202 may then send, to the remote system(s) 104, input data 236 representing the input. Using the input data 236, a remote system(s) 104 may update the first state of the network application to a second state of the network application. For example, and using the example above where the network application includes the gaming application, the input may be associated with moving the object forward by a given amount within the gaming environment. As such, the remote system(s) 104 may analyze the input data 236 to determine that the input includes moving the object forward by the given amount. The remote system(s) 104 may then update the first state of the of the network application to the second state of the network application by moving the object forward in the environment by the given amount.

The remote system(s) 104 may then send content data 1218 representing a second state of the network application to the display device 1204. The content data 1218 may include third video data representing image(s) of the second state of the network application, third audio data representing sound corresponding to the second state of the network application, and/or third timestamp data representing a time for displaying the image(s) and/or a time for outputting the sound. The display device 1204 may receive the content data 1218 from the remote system(s) 104. Using the third video data, the display device 1204 may display image(s) representing the second state of the network application. For example, and again using the example where the network application includes the gaming application, the display device 1204 may display the object located at the second position within the gaming environment. In some instances, the display device 1204 may further output the sound represented by the third audio data. In some instances, the display device 1204 displays the image(s) and/or outputs the sound according to the time(s) represented by the third timestamp data.

In some instances, the remote system(s) 104 may additionally send, to the control device 1202, content data 1218 representing the second state of the network application. The content data 1218 may include fourth audio data representing sound corresponding to the second state of the network application and/or fourth timestamp data representing a time for outputting the sound. The control device 1202 may then output the sound represented by the fourth audio data. In some instances, the control device 1202 may output the sound according to the time represented by the fourth timestamp data. In some instances, third timestamp data and/or the fourth timestamp data synchronizes the outputting of the sound by the control device 1202 with the displaying of the image(s) by the display device 1204.

In some instances, the remote system(s) 104 may continue to receive input data 236 from the control device 1202. The remote system(s) 104 may then continue to process the input data 236 in order to update the state of the network application. Based at least in part on the updating, the remote system(s) 104 may continue to send, to the display device 1204, content data 1218 (e.g., video data, audio data, timestamp data, etc.) representing the current state of the network application. The remote system(s) 104 may further send, to the control device 1202, content data 1218 (e.g., audio data, timestamp data, etc.) representing the current state of the network application. In other words, the remote system(s) 104 allow the user 1214 to access the network application that is executing on the virtual server 222.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors;
and one or more computer-readable media storing instructions that, when executed by the one or more processors, cause the one or more processors to perform operations comprising:
causing an installation of a network game from a content delivery network;
monitoring the installation of the network game in order to identify processing events that occurred during the installation; generating a log file that includes the processing events;
parsing the log file in order to:
generate an events file that includes file events from the processing events;
generate a registration file that includes registration events from the processing events; and
generate a service file that includes service events from the processing events;
copying, using at least the events file, first software files installed during the installation of the network game in order to generate second software files;
generating a bundle that includes at least the events file, the registration file, the service file, and the second software files; storing the bundle on a virtual storage device;
associating the virtual storage device with a virtual server, the virtual server including a storage drive;
based at least in part on associating the virtual storage device with the virtual server, generating junctions that point to the second software files stored on the virtual storage device;
storing the junctions on the storage device associated with the virtual server; and
causing a launching of the network game on the virtual server.

2. The system as recited in claim 1, wherein the bundle is a first bundle, the virtual storage device is a first virtual storage device, the virtual server is a first virtual server, the storage drive is a first storage device, and the junctions are first junctions, and wherein the operations further comprise:
copying the first bundle from the first virtual storage device in order to generate a second bundle;
storing the second bundle on a second virtual storage device;
associating the second virtual storage device with a second virtual server, the second virtual server including a second storage drive;
based at least in part on associating the second virtual storage device with the second virtual server, generating second junctions that point to third software files stored on the second virtual storage device; and
storing the second junctions on the second storage device.

3. The system as recited in claim 1, the operations further comprising:
generating an install file that includes one or more first commands to remap the second software files onto the storage device; and
generating a launch file that includes one or more second commands to launch the network game,
and wherein the bundle further includes the install file and the launch file.

4. A method comprising:
causing a first installation of a network application;
identifying processing events associated with the first installation of the network application;

generating a log file that includes the processing events;
parsing the log file in order to:
  generate an events file that includes file events from the processing events;
  generate a registration file that includes registration events from the processing events; and
  generate a service file that includes service events from the processing events;
copying, using at least the events file, a first software file that was installed during the first installation of the network application in order to generate a second software file;
generating a software package that includes at least the events file, the registration file, the service file, and the second software file;
storing the software package on a virtual storage device;
associating the virtual storage device with a virtual server; and
causing, based at least in part on the virtual storage device, a second installation of the network application onto the virtual server.

5. The method as recited in claim 4, wherein the processing events are first processing events, and wherein the method further comprises:
causing a launching of the network application; and
identifying second processing events associated with the launching of the network application,
and wherein the log file further includes a portion of the second processing events.

6. The method as recited in claim 4, wherein the software package is a first software package, the virtual storage device is a first virtual storage device, and the virtual server is a first virtual server, and wherein the method further comprises:
generating a second software package by copying the first software package stored on the first virtual storage device;
storing the second software package on a second virtual storage device; and
causing, based at least in part on the second virtual storage device, a third installation of the network application onto a second virtual server.

7. The method as recited in claim 4, further comprising:
generating a first file that includes one or more first commands for installing the network application onto the virtual server; and
generating a second file that includes one or more second commands to launch the network application,
and wherein the software package further includes the first file and the second file.

8. The method as recited in claim 4, further comprising:
based at least in part on associating the virtual storage device with the virtual server, generating a link that points to the second software file stored on the virtual storage device; and
storing the link on a storage device associated with the virtual server.

9. The method as recited in claim 4, wherein the processing events includes an event associated with registering the network application, and wherein the method further comprises:
generating, using the log file, a key associated with the network application; and
storing a value associated with the key in a registry of the virtual server.

10. The method as recited in claim 4, wherein the at least the portion of the processing events includes an event associated with a service of the network application, and wherein the method further comprises:
determining, using the log file, the service of the network application;
determining, using the log file, a path to the service on the virtual storage device; and
installing the service on the virtual server using the path.

11. The method as recited in claim 4, wherein the virtual server is a first virtual server, and wherein the method further comprises:
generating a second virtual server; and
causing a third installation of the network application onto the second virtual server.

12. The method as recited in claim 4, further comprising:
receiving, from a user device, a request to generate the virtual storage device, the request indicating at least a size for the virtual storage device; and
based at least in part on receiving the request, creating the virtual storage device to include the size.

13. The method as recited in claim 4, wherein the network application is a network game, the processing events are first processing events, the software package is a first software package, the virtual server is a first virtual server, and the virtual storage device is a first virtual storage device, and wherein the method further comprises:
causing an installation of a client application for running the network game;
identifying second processing events associated with the installation of the client application;
generating at least a first file that includes a portion of the second processing events;
generating a second file by at least copying a third file that was installed during the installation of the client application;
generating a second software package that includes at least the first file and the second file;
storing the second software package on a second virtual storage device; and
causing, based at least in part on the second virtual storage device, a second installation of the network application onto a second virtual server.

14. The method as recited in claim 4, wherein identifying the processing events associated with the installation of the network application comprises identifying at least one of:
a first event associated with starting a process;
a second event associated with creating the first software file;
a third event associated with writing the second software file;
a fourth event associated with writing a registration key;
a fifth event associated with writing a registration entry;
a sixth event associated with creating a service; or
a seventh event associated with renaming a file.

15. The method as recited in claim 4, further comprising:
receiving, from a user device, a request to access the network application;
associating the user device with the virtual server; and
causing, using the virtual storage device, a launching of the network application on the virtual server.

16. A system comprising:
one or more processors; and
one or more computer-readable media storing instructions that, when executed by the one or more processors, cause the one or more processors to perform operations comprising:

creating a first virtual server;
causing an installation of a network application onto the first virtual server;
identifying processing events associated with the installation of the network application onto the first virtual server;
generating a log file that includes the processing events;
parsing the log file in order to:
- generate an events file that includes file events from the processing events;
- generate a registration file that includes registration events from the processing events; and
- generate a service file that includes service events from the processing events;

copying, using at least the events file, a first software file that was installed during the installation of the network application in order to generate a second software file;
generating a software package that includes at least the events file, the registration file, the service file, and the second software file;
storing the software package on a virtual storage device; and
associating the virtual storage device with a second virtual server.

17. The system as recited in claim 16, wherein the software package is a first software package and the virtual storage device is a first virtual storage device, and wherein the operations further comprise:
generating a second software package by copying the first software package stored on the first virtual storage device;
storing the second software package on a second virtual storage device; and
associating the second virtual storage device with a third virtual server.

18. The system as recited in claim 16, the operation further comprising:
generating a first file that includes one or more first commands for installing the network application onto the first virtual server; and
generating a second file that includes one or more second commands to launch the network application,
and wherein the software package further includes the first file and the second file.

19. The system as recited in claim 16, the operation further comprising:
based at least in part on associating the virtual storage device with the second virtual server, generating a link that points to the second software file stored on the virtual storage device; and
storing the link on a storage device associated with the second virtual server.

20. The system as recited in claim 16, wherein the processing events includes an event associated with registering the network application, and wherein the operations further comprises:
generating, using the log file, a key associated with the network application; and
storing a value associated with the key in a registry of the second virtual server.

* * * * *